United States Patent Office 3,246,969
Patented Apr. 19, 1966

3,246,969
ABRASIVE COATED BACKING OF LINEAR POLY-MONO-ALPHA-OLEFINIC HYDROCARBON
Harland D. Embree, near San Jose, Calif., and Robert Lewis Doyle, White Bear Lake, Minn., assignors to Minnesota Mining and Manufacturing Company, St. Paul, Minn., a corporation of Delaware
No Drawing. Filed Oct. 7, 1959, Ser. No. 844,868
5 Claims. (Cl. 51—298)

This invention relates to products in which particulate material is firmly adhered to a heat-resistant poly-mono-α-olefinic backing. A preferred embodiment of the invention is a coated abrasive sheet material having an essentially linear, highly crystalline poly-mono-α-olefinic backing.

The particulate-coated sheet material of our invention is strong, tough, flexible, conformable, and unusually resistant to oil, moisture and common solvents. It can be subjected to wide variations of temperature and other environmental conditions without becoming weakened or greatly changing its dimensions, yet it can be readily heat sealed without adversely affecting the physical properties of the area at or near the splice. Particulate-coated sheet material subjected to severe mechanical shock, such as coated abrasive articles, printing draw sheets, nonslip floor covering surfaced with cork, plastic, mineral, or rubber particles, are moisture-resistant to an extreme degree, even at elevated temperatures or in the presence of emulsifiers or strong soaps. They are not attacked by most known solvents, including highly corrosive acids and bases. They are strong, durable, tear-resistant and light weight.

Poly-mono-α-olefins are addition polymers formed from olefin monomer units, each unit having only one double bond, which is attached to the α-carbon atom. The simplest polymer of this type is so-called "high pressure," or branched, polyethylene, from which relatively weak, heat-sensitive, extensible, and unorientable films and fibers can be formed. Such characteristics render films and fabrics of branched polyethylene generally unsuitable for rigorous applications, e.g., for use as coated abrasive backings. Poly-mono-α-olefins which may be described as essentially linear and highly crystalline include linear polyethylene made by polymerizing ethylene gas at low pressures in the presence of either a supported oxide or a transition metal halide catalyst, "stereo-regulated" homologs of linear polyethylene, substituted "stereo-regulated" homologs of linear polyethylene and modified copolymers or blends of members selected from the preceding 3 groups together with each other or with other ethylenically unsaturated materials.

"Stereo-regulated" polymers are classified as either "isotactic" or "syndiotactic," as contrasted to unregulated, or "atactic," polymers. The simplest isotactic homolog of linear polyethylene is isotactic polypropylene, in which each component monomer unit has the substituent methyl group and hydrogen atom arranged to project from asymmetric carbon atoms of the polymer chain in the same order or direction as the preceding units. A syndiotactic polymer is one in which the substituent groups of the monomer units project from the asymmetric carbon atoms of the chain in alternating orientation. Linear and stereo-regulated polymers have substantially greater degree of crystallinity, greater density, higher tensile strength, and higher melting points, than the corresponding isomeric branched and atactic polymers. Further, films and fibers made from linear highly crystalline polymers can be oriented to still further increase their tensile strength, whereas branched or atactic polymers can be oriented little if at all. Extremely strong fabrics can be formed from oriented fibers, and films can be uniaxially or biaxially oriented to increase their strength as desired.

The linear and stereo-regulated polymers which are backings for our particulate-coated sheet material are not adversely affected by temperatures of 100°–120° C., whereas branched polyethylene film shrinks, shrivels, and distorts at temperatures as low as 85° C. Many of the adhesives commonly employed in the manufacture of coated abrasive sheet material are cured at temperatures in excess of 100° C., and finished coated abrasive products frequently encounter similar temperatures. Desirably, particulate-coated material is cleaned with boiling water, or even autoclaved, for certain uses. It is thus readily apparent that branched polyethylene is eminently unsuited for our purposes.

Since olefinic backings of the type we employ—especially continuous films—are frequently unreceptive to adhesives, we ordinarily prime the surface by some technique which is useful in improving the adhesion to low density branched polyethylene. It is known that linear highly crystalline polymers are substantially less receptive to adhesives than the corresponding branched or atactic polymers, and insofar as we are aware, the prior art has actually discouraged those skilled in the abrasive art from further investigation of even branched polyethylene. For example, such priming techniques as corona discharge (Pierce et al. Patent No. 2,810,933), chlorine gas (Henderson Patent No. 2,502,841), ozone and nitrous oxide (Wolinski Patent No. 2,715,076), and acid-dichromate (Horton Patent Re. No. 24,062), have been recommended for making the surface of branched polyethylene receptive to printing ink. Ink markings applied to the primed surfaces are said to pass the "Scotch" tape test, in which a pressure-sensitive adhesive tape is adhered to the surface of the ink and rapidly removed without simultaneously removing the ink. The force which is required to remove even an extremely aggressive pressure-sensitive tape from non-tacky organic surfaces (e.g., vinyl polymers of the type often used in ink) at a rate of one inch per minute is about 1 lb. per inch of width, and at 150 inches per minute, about 3 lbs. per inch of width. Since the minimum bond-to-backing adhesion required for useful coated abrasive material when stripped off at a rate of one inch per minute is known to be about 8 lbs. per inch of width, it is apparent that the threshold value in this crude test points toward the unsuitability of polyethylene for coated abrasive applications. Other even milder adhesion tests suggested by the prior art involve the "gentle scratching (of the adhered ink) with the finger nail," rubbing the primed and ink-coated surface against white paper, or flexing and twisting the coated film. None of these tests or anything like them in mildness is used or could be used as the basic for evaluating a sheet of coated abrasive material.

Despite the fact that highly crystalline poly-mono-α-olefinic sheets are generally less receptive to adhesives than are branched polyethylene sheets, and despite the further fact that the prior art does not even state that priming techniques provide firm bonds to branched polyethylene, we have found many of the above-mentioned priming techniques to be suitable for our invention. We have found that linear crystalline poly-mono-α-olefinic sheet material is suitable as a base to which abrasive bonds and mineral particles, having a thickness of about $\frac{1}{10}$ inch or more in the case of grade 16 material, capable of being severely flexed, and suitable for demanding abrading operations can be anchored. Both waterproof and water-soluble adhesives have been used. The abrasive products may be used to remove extremely sharp and jagged edges from metal castings and the like. In contrast to cloth, paper, nylon, or vulcanized fibre, other coated abrasive backings, these polyolefinic backings are unaffected by corrosive grinding aids, such as acid salts. Endless belts can be formed by the relatively simple and inexpensive technique of heat sealing the ends. In contrast, such other thermoplastic materials as polyamides or polyesters tend to degrade rapidly and weaken when an attempt is made to heat seal them.

As we have indicated, the firmness with which a bond adhesive is attached to a coated abrasive backing is extremely important. The linear, highly crystalline poly-mono-α-olefins which we use are not all adequately adhered to by the same resins. Although some sort of priming is usually necessary to affix any adhesive, a priming technique which is suitable for a given bond adhesive applied to a given backing may not be suitable if either the backing or the adhesive system is changed. A thin "presize" coating which can be firmly adhered to the backing and which can in turn be firmly adhered to by the desired bond coat can sometimes be used to advantage. We have found a test which determines the suitability of a backing and an adhesive for each other and which does not necessitate making a particulate-coated sheet. The proposed adhesive without particles is coated on the backing, the backing first having been primed by some method if this is necessary, and thereafter dried, hardened, or cured. The coated side of a 2-inch x 11-inch strip of the coated backing is adhered to a board, e.g., with a thermosetting heat-activated blend of approximately equal parts of an epoxy resin and a polyamide curing agent, and an extended end of the strip is then pulled back over the exposed surface of the adhered portion. One end of the board is clamped in the upper jaws of a tensile testing machine and the extended end of the strip clamped in the lower jaws. The jaws are moved apart at a rate of 1 inch per minute, failure occurring when the bond adhesive strips away from the backing. Satisfactory combinations of bond and backing will have a "stripback" adhesion of at least about 8 lbs. per inch of width. It has been found that relatively hard and stiff bond adhesives, preferably display still higher stripback adhesion, e.g., at least about 15 lbs. per inch of width.

Our invention will be better understood by reference to the illustrative but non-limiting examples set forth below:

Example I

A coated abrasive sheet material suitable for sanding paint or automotive surfacer under wet conditions was made as follows:

Pellets of "Marlex 50" (a highly crystalline linear polyethylene having a density of about .96 and a softening point of about 260° F., sold by the Phillips Petroleum Company) were melted and extruded to form a 0.003 inch film. This film having a tensile strength of about 10 lbs. per inch of width, was subjected to corona discharge by passing it between two 12" x 12" copper electrodes spaced 0.5 inch apart, at a rate of 30 feet per minute. A potential of 350 volts A.C. was impressed across the electrodes at 7–9 amperes under a vacuum of about 0.5 millimeter of mercury.

The treated film was next coated with about 4.5 grains per 24 square inches of chinawood oil varnish of the type disclosed in Carlton et al. Patent No. 2,347,662. Approximately 17 grains per 24 square inches of Grade 320 silicon carbide was now applied, after which the mineral-coated sheet was cured for 20 hours at 200° F. The structure was then coated with a sandsize adhesive, identical in composition to the previously applied coat, after which the material was again heated for 20 hours at 200° F. The slipperiness of the back surface was reduced by applying a solution of a flexible rubber phenolic thereto sprinkling it with cork flour and driving off the solvent. Adhesion of the varnish bond to the backing exceeded the tensile strength of the film itself. The cured coated abrasive product was found, for example, to be entirely satisfactory for the hand sanding of automotive sealer, showing an initial conformability with no tendency to soften or otherwise change its handling characteristics after continued use.

Example II

Pellets of "Marlex 50" were melted and extruded to form a .010 inch film to be used as the backing for coated abrasive sheet material. The film was primed by immersing it for one hour at room temperature in a solution of 7 parts of $KMnO_4$, 63 parts of water and 30 parts of 12 N $H_2SO_4$. It was then removed from the priming solution, carefully rinsed in tap water, and allowed to dry.

To one surface of the primed film was applied 15 grains per 24 square inches of a conventional, base-catalyzed, water-soluble phenolic resin containing 83 percent non-volatiles, after which 73 grains of grade 120 aluminum oxide was applied. The mineral-coated structure was precured for two hours at 175° F. and then sandsized with 18 grains per 24 square inches of an adhesive containing 49.8 parts of "Epon 828," 33.2 parts of "Versamid 125," and 17 parts of xylol. ("Epon 828," supplied by the Shell Chemical Company, is the diglycidyl ether of bis-phenol A, having an epoxy number of 198 grams per OH equivalent and a viscosity at room temperature of about 10,000 cps. "Versamid 125," supplied by General Mills, is an amine-terminated polyamide resin made by reacting polymeric fat acids and aliphatic polyamides; it has a viscosity at room temperature of about 50,000 cps. and an amine value of about 305 grams of resin per amine equivalent.) The material was then cured for 16 hours at 200° F., after which it was found to have a stripback adhesion of 25 lbs. per inch of width and to be highly effective in both wood and metal sanding operations.

Example III

A .009 inch film having a tensile strength of 26 lbs. per inch of width was prepared by melting pellets of "Hifax" polyethylene (a highly crystalline product having a density of .945 and a melting point of 268° F., marketed by the Hercules Chemical Company) and extruding the molten polymer. This film was then primed in the same manner as that of Example I.

To one surface of the primed film was applied 11 grains per 24 square inch of a 38% water solution of a No. 2½ hide glue bond adhesive, after which 32 grains of Grade 220 aluminum oxide was electrostatically applied. After the bond adhesive had gelled, a sandsize adhesive of 16 grains per 24 square inch of 12% hide glue solution was applied, and the structure dried by heating two hours at 150° F. Stripback adhesion of the glue bond to the primed backing was found to be 9 lbs. per inch of width. This product was found to be useful in the abrasion of a narrow steel bar forced against the surface of the abrasive with a pressure of over 125 lbs. per square inch.

Example IV

A .009 inch film having a tensile strength of 36 lbs. per inch of width was made by melting pellets of "Profax" polypropylene (an isotactic highly crystalline material having a density of .90 and a softening point of 333° F., sold by the Hercules Chemical Company) and extruding the molten polymer.

A 4" x 8" section of the "Profax" film was primed by passing one surface back and forth about 1½ inches above a Meker burner flame, a total of about 5 seconds being required to prime the entire surface. About 12 grains of a "make" adhesive made by mixing 49.8 parts of "Epon 828," 33.2 parts of "Versamid 125," and 17 parts of xylol, was then applied to the primed surface. About 52 grains per 24 square inches of Grade 120 aluminum oxide was then applied and the mineral-coated product cured for 2 hours at 200° F. The structure was then sandsized by applying 8 grains per 24 square inches of the phenolic resin referred to in Example II, after which it was precured for 3 hours at 175° F. and cured at 16 hours at 200° F. Stripback adhesion of the bond to the backing was found to be 20 lbs. per inch of width.

In steel sanding operations, this produce removed more steel per weight of mineral lost than did a conventional coated abrasive product of comparable construction but having a drills backing.

*Example V*

A .003″ film of "Marlex 50" was primed by exposing it to a chlorine gas atmosphere for 30 minutes at room temperature. The film was then removed from the chlorine atmosphere and coated with 13 grains per 24 square inches of the "Epon"-"Versamid" adhesive "make" coat described in Example IV. About 34 grains of grade 120 aluminum oxide mineral was then applied, after which the mineral-coated structure was precured for 2 hours at 200° F. The precured structure was then coated with 7 gr./4 x 6 of a sandsize adhesive identical to that described in Example IV, after which the sheet material was precured for 3 hours at 175° F. and cured for 16 hours at 200° F. Adhesion of the "make" coat to the backing exceeded the strength of the backing itself, and the finished product was found to be satisfactory for light sanding operations.

*Example VI*

A .012″ film of "Profax" was extruded and used as the backing for coated abrasive sheet material. The film passed at a rate of 30 feet per minute between two concentric semi-cylindrical electrodes spaced 0.125 inch, the total electrode length being 19.6 inches. A potential of 5,000 volts A.C., 400 cycles per second, at 9 amperes was impressed across the electrode to provide a corona discharge and thus prime the surface of the film adjacent the outer electrode.

About 19 grains per 24 square inches of the bond adhesive used in Example IV was applied to the primed surface of the film, 83 grains of grade 80 aluminum oxide mineral electrostatically applied, and the structure precured 3 hours at 125° F. The bond adhesive was diluted to 74% non-volatiles to form a sandsize adhesive, and 17 grains per 24 square inches applied. The structure was then cured 3 hours at 125° F. Stripback adhesion was 20.5 lbs. per inch of width.

A belt was fabricated from the cured sheet material of this example by slitting a 3-inch-wide strip 84 inches long and cutting the ends at 45° angles to form a parallelogram. The ends were abutted and a ¾-inch x 6-inch x .006-inch strip of "Profax" laid on the back along the line of abutment. An electric iron heated to 375° F. was then used to heat seal the films together. After cooling, the excess strip was trimmed away. When mounted on a conventional backstand machine and entrained over a 14-inch diameter 45-durometer smooth rubber contact roll driven at 6,580 surface feet per minute, the belt abraded cold rolled steel bars for 12 minutes before failure by dulling of the mineral particles occurred.

*Example VII*

A linear polyethylene cloth weighing 0.491 lb. per square yard and having a thread count of 48 x 34 threads per inch, formed from continuous multifilament Union Carbide "Fiber B" (melting point, 266° F.; specific gravity 0.96), was obtained from the Wellington Sears Company. This cloth, which had a tensile strength of 178 lbs. per inch of width in the machine direction and 126 lbs. per inch of width in the cross direction, was coated with a 1.5-mil film of the phenolic resin bond adhesive described in Example II. Grade 120 aluminum oxide mineral was then sprinkled on and the excess shaken off. The structure was precured for 2 hours at 200° F. and then sandsized with a slightly more dilute solution of the bond adhesive. The structure was then cured for 16 hours at 200° F. Stripback adhesion was 8.2 lbs. per inch of width, and the material was used for sanding metal, wood, and plastic materials.

Although the examples set forth above describe especially useful embodiments of our invention and illustrate readily available linear highly crystalline poly-mono-α-olefinic backings, many other structures are contemplated and embraced by our invention. For example, we may employ backings made from butene-1, 3-methylbutene-1, 4 - methylpentene-1,4-methylhexene-1, 5-methylhexene-1, 4,4-dimethylpentene-1, and styrene. Similarly, copolymers or blends which essentially comprise linear poly-mono-α-olefinic resins may have certain advantages over one-component systems. For example, resistance to stress cracking, can be obtained by the linear copolymerization of aliphatic poly-mono-α-olefins, e.g., ethylene and butene-1, and additional toughness by the linear copolymerization of propylene and diolefins such as isoprene, etc.

In many applications the particulate-coated sheet material of our invention may be adhered or laminated to other materials. For example, particulate-coated non-slip flooring may be adhered to stair treads and a disc of coated abrasive material may be adhered to a rigid support. Similarly, coated abrasive belts which are subjected to extremely high tension may be formed by adhering the coated abrasive material of our invention to endless steel or vulcanized fibre bands. Certain fine grit coated abrasive sheets are useful as coverings for surfaces to be written on with chalk, pencils, and the like, and are frequently adhered to the surfacese for such use. For these and similar purposes we may apply a pressure-sensitive adhesive to the back of our particulate-coated material.

Having thus set forth our invention with the aid of illustrative examples, we do not intend to be limited in any regard other than by the scope of the appended claims.

What we claim is:

1. A coated abrasive sheet material comprising in combination a substantially linear poly-mono-alpha-olefinic hydrocarbon backing capable of resisting temperatures of at least 85° C. without distorting, a strong hardened bond adhesive differing in composition from said backing and firmly adhered thereto, and a multiplicity of abrasive granules firmly affixed to said backing by said adhesive.

2. An extremely versatile coated abrasive sheet material resistant to organic solvents and corrosive grinding aids, and capable of being made into endless bands by the simple heat sealing of elongated strips, said sheet material comprising a self-sustaining backing sheet formed from polymerized aliphatic mono-alpha-olefinic hydrocarbon material, said backing sheet being capable of withstanding exposure to temperatures of at least 85° C. even in the presence of water, without shrinking or distorting, a strong hardened bond adhesive differing in composition from said backing sheet and firmly adhered thereto, a layer of abrasive granules firmly embedded in said bond adhesive, and a strong hardened sandsize adhesive lying over and anchoring said abrasive granules.

3. An extremely versatile coated abrasive sheet material resistant to organic solvent and corrosive grinding aids, and capable of being made into endless bands by the simple heat-sealing of elongated strips, said sheet material comprising a self-sustaining continuous film of polymerized aliphatic mono-alpha-olefinic hydrocarbon material capable of being subjected to temperatures of at least 85° C., even in the presence of water, without shrinking or distorting, a strong hardened bond adhesive firmly adhered to said film, a layer of abrasive granules firmly embedded in said bond adhesive, and a strong hardened sandsize adhesive lying over and anchoring said abrasive granules.

4. The coated abrasive sheet material of claim 3 wherein said polymerized aliphatic mono-alpha-olefinic hydrocarbon material is isotactic polyproylene.

5. A coated abrasive sheet material comprising in combination a flexible isotactic polypropylene backing sheet, a strong hardened abrasive binder coat firmly adhered to said backing sheet, and a layer of abrasive grains embedded in and firmly adhered to by said binder coat.

References Cited by the Examiner

UNITED STATES PATENTS

| | | | |
|---|---|---|---|
| 2,230,934 | 2/1941 | Carlton et al. | 51—298.1 |
| 2,252,587 | 8/1941 | Tone et al. | 51—298.1 |
| 2,286,208 | 6/1942 | Kirchner | 51—299 |
| 2,740,725 | 8/1956 | Ball | 51—298.1 |
| 2,878,142 | 3/1959 | Bohaty | 117—76 |
| 2,899,288 | 8/1959 | Barclay | 51—298 |
| 2,931,740 | 4/1960 | Riboni | 117—138.8 |

ROBERT F. WHITE, *Primary Examiner.*

JOSEPH REBOLD, JOHN R. SPECK, MORRIS LIEBMAN, ALFRED L. LEAVITT, *Examiners.*